(12) United States Patent
Abusleme et al.

(10) Patent No.: US 7,381,463 B2
(45) Date of Patent: Jun. 3, 2008

(54) METAL SUBSTRATES COATED WITH FLUOROPOLYMERS

(75) Inventors: Julio A. Abusleme, Varese (IT); Giambattista Besana, Como (IT); Claudia Manzoni, Bologna (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/208,809

(22) Filed: Aug. 1, 2002

(65) Prior Publication Data
US 2003/0031875 A1  Feb. 13, 2003

(30) Foreign Application Priority Data
Aug. 2, 2001  (IT) .................... MI2001A1682

(51) Int. Cl.
*B32B 15/08* (2006.01)
*B32B 27/20* (2006.01)
*B32B 27/28* (2006.01)

(52) U.S. Cl. .................. 428/332; 428/421; 428/457

(58) Field of Classification Search ................ 428/421, 428/457, 332; 526/249
See application file for complete search history.

(56) References Cited

U.S. PATENT DOCUMENTS

| 3,745,145 | A | * | 7/1973 | Khattab ................. 524/128 |
| 3,773,698 | A | * | 11/1973 | Khattab ................. 524/146 |
| 3,947,525 | A | * | 3/1976 | Robertson et al. .......... 524/146 |
| 4,098,756 | A | | 7/1978 | Miller et al. ................. 525/120 |
| 4,539,354 | A | * | 9/1985 | Chung et al. ............... 524/128 |

FOREIGN PATENT DOCUMENTS

| EP | 0 695 766 A1 | 2/1996 |
| EP | 0 816 400 A1 | 1/1998 |
| JP | 03163147 | 7/1991 |

OTHER PUBLICATIONS

Encyclopedia of Polymer Science and Engineering, vol. 6: Epoxy Resins, pp. 362-365, Jun. 1987.*
Ullmann's Encyclopedia of Industrial Chemistry, 5$^{th}$ Edition, vol. A18, Paints and Coatings: 4.1 Inorganic Pigments, May 1994.*

* cited by examiner

*Primary Examiner*—Ramsey Zacharia
(74) *Attorney, Agent, or Firm*—Arent Fox LLP

(57) ABSTRACT

Metal substrates having a coating based on ethylene/chlorotrifluoroethylene (E/CTFE) having a $T_{mII}$ of 230° C.-264° C. and a MFI lower than 5 g/10'.

37 Claims, No Drawings

METAL SUBSTRATES COATED WITH FLUOROPOLYMERS

The present invention relates to a metal substrate having a polymer coating provided with good mechanical properties and adhesion to the substrate, with a low permeability to water-vapor able to avoid the corrosion of the substrate and the coating delamination.

More specifically the present invention relates to a metal substrate having a polymer coating based on an ethylene/chlorotrifluoroethylene (E/CTFE) copolymer endowed with the combination of the above properties.

It is known that the metal equipments used in CPI (Chemical Process Industry) such as for example tanks, piping, reactors, pumps and valves built for example in brass, aluminum, bronze, stainless steel and carbon steel, are protected from the corrosion by using protective coatings based on polymers.

Among the various coating application methods, those employing polymer dispersions in organic solvents or their aqueous latexes and the electrostatic powder coating can be mentioned. Among said methods the electrostatic powder coating, wherein the polymer particles are electrostatically charged and deposited on the heated and earthed metal surface, have acquired a remarkable importance. Generally, the metal surface is previously cleaned and roughed, for example, by etching and sandblasting, to obtain a higher adhesion of the coating to the substrate and then heated at a temperature higher than the melting temperature of the polymer coating.

Fluorinated polymers based on E/CTFE having a high Melt Flow Index (>10 g/10') are commercially used for their good chemical resistance as coating materials in manufactured articles by the electrostatic powder coating technology. The Applicant has found that the adhesion between said copolymers and the metal substrate is not very high in the applications wherein the coated metal manufactured article comes into contact with an environment saturated with water-vapor at high temperature, as shown by the presence of blisters or the coating delamination. (See comparative Examples).

To increase the adhesion, the use of a primer formed by a mixture of said E/CTFE-based copolymers, an epoxy resin and transition metal oxides as Co, Ni, Mn, W has been suggested in U.S. Pat. No. 4,098,756. However said systems do not allow to obtain manufactured articles wherein the coating results resistant to mechanical shocks which can cause discontinuity and/or rupture of the primer layer with consequent substantial decrease of its barrier capabilities to the water-vapor permeation.

The need was therefore felt to have available a coating having the following combination of properties:
good mechanical properties and absence of fragility of the single layers forming the coating;
very good adhesion to the metal substrate, even in an environment saturated with water-vapor at high temperature (100° C.) for times higher than 500 hours, preferably 1,000.

It has been unexpectedly and surprisingly found that it is possible to obtain coatings having the above properties when in the electrostatic powder coating with E/CTFE-based polymers a particular polymer as first coating layer is used.

An object of the present invention is a metal substrate with a coating comprising a polymer layer a) in contact with the substrate, formed by a copolymer based on ethylene/chlorotrifluoroethylene (E/CTFE) having a second melting temperature ($T_{mII}$) in the range 230° C.-264° C. and a Melt Flow Index (MFI) lower than 5 g/10', optionally filled with inorganic pigments, metal oxides, mica powder.

The layer a) has a thickness of at least 100 micron, preferably of at least 200 micron.

Alternatively in addition to the layer a), a layer b) in contact with layer a) can be used, formed by an ethylene/chlorotrifluoroethylene (E/CTFE) copolymer, optionally containing a comonomer selected from the group formed by 3,3,3-trifluoro 2-trifluoromethyl propene (HFIB), perfluoropropylvinylether (PFVE), 2,2,4-trifluoro-5-trifluoromethoxy-1,3-dioxole (TTD), preferably PFVE, having a Melt Flow Index in the range of 5 g/10' to 30 g/10', optionally filled with inorganic pigments, metal oxides, mica powders.

The mica powder amount contained in layers a) and b) can range from 0.1% to 15% by weight, preferably between 0.5-5% by weight. The mica powder is preferably coated with titanium dioxide. The other optional components as pigments and metal oxides are in the range 0.1%-30% by weight.

The E/CTFE of layer a) is formed by:
45-55% by moles of ethylene,
55-45% by moles of chlorotrifluoroethylene.

The copolymer MFI of layer a) can range from 0.01 to 5 g/10', preferably from 0.1 to 3 g/10'.

The layer a) polymer based on ethylene and chlorotrifluoroethylene can also contain small amounts of a third comonomer provided that the second melting temperature $T_{mII}$ and the MFI remain in the above mentioned ranges. As third comonomer it can be used for example 3,3,3-trifluoro 2-trifluoromethyl propene (HFIB), perfluoropropylvinylether (PFVE), 2,2,4-trifluoro-5-trifluoromethoxy-1,3-dioxole (TTD), n-butylacrylate or mixtures thereof.

Preferably the copolymer (E/CTFE) of layer a) has a second melting temperature ($T_{mII}$) in the range 235° C.-250° C.

The E/CTFE of layer b) is formed by:
40-60% by moles of ethylene,
60-40% by moles of chlorotrifluoroethylene,
0-10% by moles with respect to the sum of E+CTFE, of a third monomer.

The layers a) and b) polymers can contain additives such antioxidant agents, anti-UV agents, thermal stabilizers, acid-scavenger, generally each of these components in amounts comprised between 0.1% and 5% by weight.

More preferably the invention coating comprises a layer a) of at least 300 micron and optionally a layer b) so to obtain a coating thickness comprised between 500 and 2,500 micron, selected according to the use.

With the coatings of the invention it is possible to obtain coated manufactured articles, wherein the coating has a low permeability to the water-vapor, high adhesion and resistance to delamination and good mechanical and chemical resistance properties.

As said the substrates which can be coated with the invention polymers are formed by metals such as brass, aluminum, bronze, stainless steel and carbon steel, preferably carbon steel.

As said the invention polymers can be applied to the metal substrates by various methods known in the prior art.

For example polymer dispersions in organic solvents, aqueous polymer latexes, and electrostatic polymer powder coating, can be mentioned. The latter is the preferred method for applying the invention coatings. As said, according to said method the polymer particles are electrostatically charged and deposited on the heated and earthed metal surface. Usually, the surface of the substrate is previously cleaned as above said.

The following characterizations were carried out on the polymers mentioned in the examples:

Characterization:
Melt Flow Index (M.F.I.)
The M.F.I. of the fluorinated polymers is measured according to the ASTM 3275-89 method, at 275° C. and with a weight of 2.16 kg.
Second Melting Temperature ($T_{mII}$)
The $T_{mII}$ of the fluorinated polymers is determined by differential scanning calorimetry (DSC).
Permeability to Water-Vapor at 100° C.
A metal plaque coated with a polymer layer is subjected to saturated water-vapor atmosphere at 100° C. The time at which blisters appear on the coating surface is measured.
Peeling Force
The necessary force (N/mm) to separate the coating from the substrate is measured by a dynamometer.

Some illustrative Examples but not limitative of the present invention follow.

EXAMPLES

Preparation of the Specimens

A carbon steel plaque of 100 mm×100 mm with a thickness of 3 mm is sandblasted with sand of the type 16 mesh-sized brown red Corindone ALIDUR®, obtaining a roughness of about 7 micron.

Subsequently the plaque is heated in an oven at 275° C. for 40 minutes and then extracted from the oven and earthed. The coating material is immediately sprayed thereon under the form of dry powder using a gun produced by the Swiss company GEMA, mod. 701/6, which electrostatically charges said powder with 40 kV voltage.

The plaque, after having been homogeneously coated with a first powder layer, is put again in the oven at the same temperature for 10 minutes.

Once the plaque has been extracted from the oven, other powder layers can be applied thereon, equal to or different from that of the first layer, repeating the above spraying and heating procedures in the oven.

More plaques are prepared, some of which are exposed to saturated water-vapor at 100° C. (1 atm). Then the peeling force is measured on the plaques exposed to saturated water-vapor and on those not exposed.

Example 1

By using the above general procedure for preparing the specimens, some plaques have been coated with a layer a) formed by two layers of which the former in contact with the metal surface, each having a thickness of about 150 micron, obtained from powders of an Ethylene/Chlorotrifluoroethylene (E/CTFE) copolymer 50/50 molar, having a MFI of 0.7 g/10' and a $T_{mII}$ of 240° C., having a particle size between 10-70 micron, and with a layer b) formed by three successive layers, each having a thickness of about 200 micron, obtained from powders of an Ethylene/chlorotrifluoroethylene/perfluoropropylvinylether (E/CTFE/PFVE) polymer 49.8/48.5/1.7 by moles, having a MFI equal to 13 and a $T_{mII}$ of 221° C. and having an average particle size of 120 micron.

On the so obtained plaques the peeling force has been measured on the plaques exposed to saturated water-vapor and on those not exposed.

It has also been determined the exposure time to saturated water-vapor after which blisters appear on the plaque. The obtained results are shown in Table 1.

The mechanical properties at 23° C. of the polymer used in layer a) are the following:

| | |
|---|---|
| Elastic modulus: | 1480 MPa |
| Yield stress: | 32 MPa |
| Stress at break: | 55 MPa |
| Elongation at break: | 240% |

Said values show that layer a) polymer is not fragile but strong and that substantially it has the same good mechanical properties of layer b) polymer.

Example 2

Comparative

The preparation of Example 1 has been repeated except that in the preparation of the first two layers, powders of an Ethylene/Chlorotrifluoroethylene (E/CTFE) 50/50 molar copolymer have been used, having a MFI of 10 g/10' and a $T_{mII}$ of 242° C. and having an average particle size of 120 micron.

On the so obtained plaques the peeling force has been measured on the plaques exposed to saturated water-vapor and on those not exposed.

It has also been determined the exposure time to saturated water-vapor after which blisters appear on the plaque. The obtained results are shown in Table 1.

Example 3

The preparation of Example 1 has been repeated except that in layer a) a mixture containing 97% by weight of powders of the E/CTFE copolymer of Example 1 and 3% by weight of mica powder (coated with titanium oxides) IRIODIN® 123 by MERCK having a particle size between 5 and 25 micron, has been used.

On the so obtained plaques the peeling force has been measured on the plaques exposed to saturated water-vapor and on those not exposed. It has also been determined the exposure time to saturated water-vapor after which blisters appear on the plaque. The obtained results are shown in Table 1.

The mechanical properties at 23° C. of the mixture used in layer a) are the following:

| | |
|---|---|
| Elastic modulus: | 1598 MPa |
| Yield stress: | 30.6 MPa |
| Stress at break: | 45 MPa |
| Elongation at break: | 190% |

Said values show that layer a) polymer mixture is not fragile but strong and that substantially it has the same good mechanical properties of layer b) polymer.

Example 4

Example 3 has been repeated with the difference that layer a) has been obtained by applying three layers formed by the same mixture of powders.

On the so obtained plaques the peeling force has been measured on the plaques exposed to saturated water-vapor and on those not exposed. The obtained results are shown in Table 1.

Example 5

Comparative

By using the same coating procedure used in the previous Examples, some plaques have been coated with five layers, each having a thickness of about 230 micron, obtained from powders of a polymer Ethylene/Chlorotrifluoroethylene/3,3,3-trifluoro 2-trifluoromethyl propene (E/CTFE/HFIB) 49/49/2 by moles, having a MFI of 13 g/10' and a $T_{mII}$ of 223° C. and having an average particle size of 120 micron.

On the so obtained plaques the peeling force has been measured on the plaques exposed to saturated water-vapor and on those not exposed.

It has also been determined the exposure time to saturated water-vapor after which blisters appear on the plaque. The obtained results are shown in Table 1.

Example 6

Comparative

Example 5 has been repeated using powders of an Ethylene/Chlorotrifluoroethylene/Perfluoropropylvinylether (E/CTFE/PFVE) polymer 49.8/48.5/1.7 by moles, having a MFI equal to 13 and a $T_{mII}$ 221° C. and having an average particle size of 120 micron.

On the so obtained plaques the peeling force has been measured on the plaques exposed to saturated water-vapor and on those not exposed. It has also been determined the exposure time to saturated water-vapor after which blisters appear on the plaque. The obtained results are shown in Table 1.

TABLE 1

| Example | Exposure time to saturated water-vapor at 100° C. (h) | Peeling Force (N/mm) | Blister presence |
|---|---|---|---|
| 1 | 0 | not delaminated (*) | — |
|  | 672 | 13.2 | NO |
|  | 1584 | <1 | YES |
| 2 (comp.) | 0 | 5.0 | — |
|  | 528 | <1 | YES |
| 3 | 0 | not delaminated (*) | — |
|  | 672 | not delaminated (*) | NO |
|  | 1584 | <1 | YES |
| 4 | 0 | not delaminated (*) | — |
|  | 672 | not delaminated (*) | NO |
|  | >1700 | not delaminated (*) | NO |
| 5 (comp.) | 0 | not delaminated (*) | — |
|  | 24 | 2.2 | NO |
|  | 144 | 0 | YES |
| 6 (comp.) | 0 | not delaminated (*) | — |
|  | 265 | 0 | YES |

(*) the coating breaks but it is not delaminated from the substrate

The invention claimed is:

1. A metal substrate with a coating comprising a polymer layer a) in contact with the substrate, wherein the layer a) consists of a copolymer of ethylene/chlorotrifluoroethylene (E/CTFE) having a second melting temperature ($T_{mII}$) in the range of 235° C. to 250° C. and a Melt Flow Index (MFI) lower than 5 g/10' and filled with mica powder, and wherein the coating shows adhesion for a period of time longer than 500 hours in an environment saturated with water vapors at 100° C.

2. A metal substrate coated according to claim 1, wherein layer a) is formed by a copolymer comprising 45% to 55% by moles of ethylene and 55% to 45% by moles of chlorotrifluoroethylene, having a Melt Flow Index (MFI) in the range from 0.01 g/10' to 5 g/10'.

3. A metal substrate coated according to claim 1, wherein layer a) is formed by a copolymer comprising 45% to 55% by moles of ethylene and 55% to 45% by moles of chlorotrifluoro ethylene having a Melt Flow Index (MFI) in the range of from 0.1 g/10' to 3 g/10'.

4. A metal substrate coated according to claim 1, wherein the mica amount is in the range from 0.1% to 15% by weight.

5. A metal substrate coated according to claim 1, wherein the mica amount is in the range from 0.5% to 5% by weight.

6. A metal substrate coated according to claim 1, wherein the mica is coated with titanium dioxide.

7. A metal substrate according to claim 1, wherein layer a) has a thickness of at least 100 micron.

8. A metal substrate according to claim 1, wherein layer a) has a thickness of at least 200 micron.

9. A metal substrate according to claim 1, having a coating thickness in the range of from 500 micron to 2,500 micron.

10. A metal substrate with a coating comprising a polymer layer a) in contact with the substrate, wherein the layer a) consists of a copolymer of ethylene/chlorotrifluoroethylene (E/CTFE) having a second melting temperature ($T_{mII}$) in the range of 235° C. to 250° C. and a Melt Flow Index (MFI) lower than 5 g/10' and filled with mica powder, a thermal stabilizer and optionally one or more of the following: inorganic pigments, metal oxides, antioxidant agents, anti-UV agents, and acid scavengers, wherein the metal substrate is selected from the group consisting of: brass, aluminum, bronze, stainless steel, and carbon steel, and wherein the coating shows adhesion for a period of time longer than 500 hours in an environment saturated with water vapors at 100° C.

11. A metal substrate according to claim 10 wherein layer a) is formed by a copolymer comprising 45% to 55% by moles of ethylene and 55% to 45% by moles of chlorotrifluoroethylene, having a Melt Flow Index (MFI) in the range from 0.01 g/10' to 5 g/10'.

12. A metal substrate coated according to claim 10, wherein layer a) is formed by a copolymer comprising 45% to 55% by moles of ethylene and 55% to 45% by moles of chlorotrifluoroethylene having a Melt Flow Index (MFI) in the range of from 0.1 g/10' to 3 g/10'.

13. A metal substrate coated according to claim 10, wherein the mica amount is in the range from 0.1% to 15% by weight.

14. A metal substrate coated according to claim 10, wherein the mica amount is in the range from 0.5% to 5% by weight.

15. A metal substrate coated according to claim 10, wherein the mica is coated with titanium dioxide.

16. A metal substrate according to claim 10, wherein layer a) has a thickness of at least 100 micron.

17. A metal substrate according to claim 10, wherein layer a) has a thickness of at least 200 micron.

18. A metal substrate according to claim 10, having a coating thickness in the range of from 500 micron to 2,500 micron.

19. A metal substrate with an electrostatic powder coating comprising a polymer layer a) in contact with the substrate, wherein the layer a) consists of a copolymer of ethylene/ chlorotrifluoroethylene (E/CTFE) having a second melting temperature ($T_{mII}$) in the range of 235° C. to 250° C. and a Melt Flow Index (MFI) lower than 5 g/10', and wherein the metal substrate is selected from the group consisting of: brass, aluminum, bronze, stainless steel, and carbon steel, and wherein the coating shows adhesion for a period of time longer than 500 hours in an environment saturated with water vapors at 100° C.

20. A metal substrate with an electrostatic powder coating comprising a polymer layer a) in contact with the substrate, wherein the layer a) consists of a copolymer of ethylene/ chlorotrifluoroethylene (E/CTFE) having a second melting temperature ($T_{mII}$) in the range of 235° C. to 250° C. and a Melt Flow Index (MFI) lower than 5 g/10', and a thermal stabilizer, and optionally one or more of the following: inorganic pigments, metal oxides, antioxidant agents, anti-UV agents, and acid scavengers, and wherein the metal substrate is selected from the group consisting of: brass, aluminum, bronze, stainless steel, and carbon steel, and wherein the coating shows adhesion for a period of time longer than 500 hours in an environment saturated with water vapors at 100° C.

21. A metal substrate according to claim 19 or 20, wherein layer a) is formed by a copolymer comprising 45% to 55% by moles of ethylene and 55% to 45% by moles of chlorotrifluoroethylene, having a Melt Flow Index (MFI) in the range from 0.01 g/10'.

22. A metal substrate according to claim 19 or 20, wherein layer a) is formed by a copolymer comprising 45% to 55% by moles of ethylene and 55% to 45% by moles of chlorotrifluoro ethylene having a Melt Flow Index (MFI) in the range of from 0.1 g/10' to 3 g/10'.

23. A metal substrate according to claim 19 or 20, wherein layer a) has a thickness of at least 100 micron.

24. A metal substrate according to claim 19 or 20, wherein layer a) has a thickness of at least 200 micron.

25. A metal substrate according to claim 19 or 20, having a coating thickness in the range of from 500 micron to 2,500 micron.

26. A metal substrate with a coating comprising a polymer layer a) in contact with the substrate, wherein
the layer a) consists essentially of a copolymer of ethylene/chlorotrifluoroethylene (E/CTFE) having a second melting temperature ($T_{mII}$) in the range of 230° C. to 264° C. and a Melt Flow Index (MFI) lower than 5 g/10', optionally filled with inorganic pigments, metal oxides, or mica powder, and
a layer b), in contact with layer a), said layer b) formed from a copolymer of ethylene and chlorotrifluoroethylene, optionally containing a comonomer selected from the group consisting of 3,3,3-trifluoro 2-trifluoromethyl propene (HFIB), perfluoropropylvinylether (PFVE), and 2,2,4-trifluoro-5-trifluoromethoxy-1,3-dioxole (TTD), having a Melt Flow Index in the range of 5 g/10' to 30 g/10'.

27. A metal substrate according to claim 26, wherein the copolymer of ethylene and chlorotrifluoroethylene of layer b) contains perfluoroprolyvinyl ether (PFVE) as a comonomer.

28. A metal substrate according to claim 26, wherein layer a) is formed by a copolymer comprising 45% to 55% by moles of ethylene and 55% to 45% by moles of chlorotrifluoro ethylene having a Melt Flow Index (MFI) in the range of from 0.01 g/10' to 5 g/10' and a $T_{mII}$ in the range of 235° C. to 250° C.

29. A metal substrate according to claim 26, wherein layer a) is formed by a copolymer comprising 45% to 55% by moles of ethylene and 55% to 45% by moles of chlorotrifluoro ethylene having a Melt Flow Index (MFI) in the range of from 0.1 g/10' to 3 g/10' and a $T_{mII}$ in the range of 235° C. to 250° C.

30. A metal substrate coated according to claim 26, wherein layer b) comprises a copolymer formed by 40% to 60% by moles of ethylene, 60% to 40% by moles of chlorotrifluoroethylene and by 0% to 10% by moles with respect to the sum ethylene+chlorotrifluoroethylene, of a third monomer.

31. A metal substrate coated according claim 26, wherein layer a) and/or layer b) are filled with one or more of the following: inorganic pigments, metal oxides, mica powder, thermal stabilizers, antioxidant agents, anti-UV agents, and acid scavengers.

32. A metal substrate coated according to claim 31, wherein the mica amount is in the range from 0.1% to 15% by weight.

33. A metal substrate coated according to claim 31, wherein the mica amount is in the range from 0.5% to 5% by weight.

34. A metal substrate coated according to claim 31, wherein the mica is coated with titanium dioxide.

35. A metal substrate according to claim 26, wherein layer a) has a thickness of at least 100 micron.

36. A metal substrate according to claim 26, wherein layer a) has a thickness of at least 200 micron.

37. A metal substrate according to claim 26, having a coating thickness in the range from 500 to 2,500 micron.

* * * * *